J. D. LYNCH.
Cultivators.
No. 153,586.    Patented July 28, 1874.
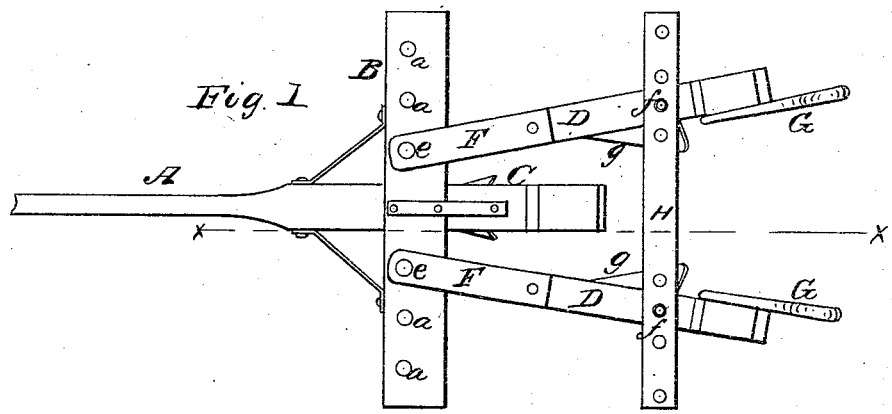
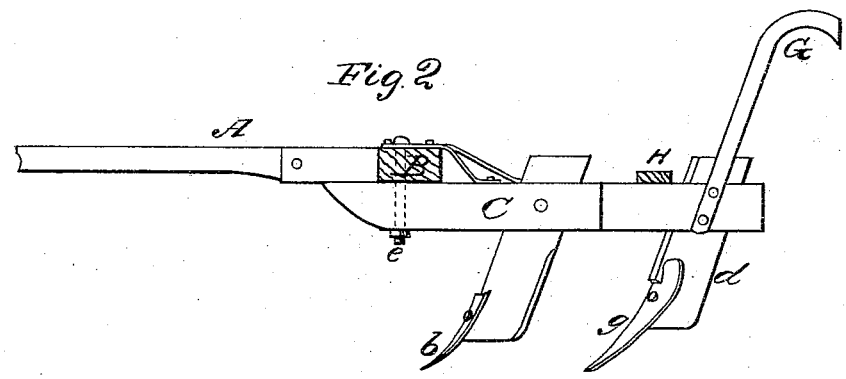
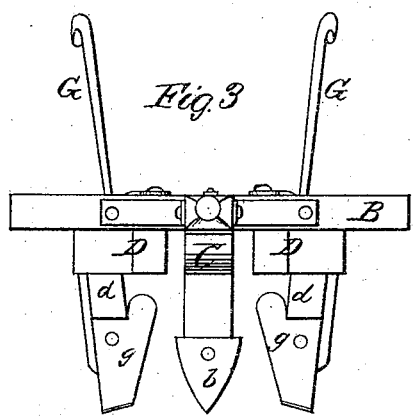
WITNESSES
Robert Everett.
George E. Upham.
BY
INVENTOR
Jasper D. Lynch
Chipman Hosmer & Co
ATTORNEYS
THE GRAPHIC CO. PHOTO-LITH.39 & 41 PARK PLACE, N.Y.

UNITED STATES PATENT OFFICE.

JASPER D. LYNCH, OF INDEPENDENCE, MISSISSIPPI.

IMPROVEMENT IN CULTIVATORS.

Specification forming part of Letters Patent No. 153,586, dated July 28, 1874; application filed May 16, 1874.

*To all whom it may concern:*

Be it known that I, JASPER D. LYNCH, of Independence, in the county of Tate and State of Mississippi, have invented a new and valuable Improvement in Cultivators; and I do hereby declare that the following is a full, clear, and exact description of the construction and operation of the same, reference being had to the annexed drawings making a part of this specification, and to the letters and figures of reference marked thereon.

Figure 1 of the drawing is a representation of a plan view of my cultivator, and Fig. 2 is a sectional view. Fig. 3 is an end view.

This invention has relation to cultivators which are especially designed for cultivating cotton-plants, but which may be used for the cultivation of crops generally. The nature of my invention consists in a gang of plows, consisting of a central plow, which is rigidly but removably attached to the draft-pole, in combination with two plows, whose beams are pivoted to a transverse cross-bar, which is rigidly secured to the rear end of a draft-pole, which beams are adjustable laterally for different widths of rows, and which are connected together at or near their rear ends, as will be hereinafter more fully explained. My object is to stir the soil in the center of the furrow, and at the same time to guide the two rear plows, which operate near the roots of the plants, along the line of the row without cutting the roots of the plants; also, to be able to adjust my implement and adapt it to different widths of rows.

In the annexed drawings, A designates the draft-pole. B designates a cross-bar, to the middle of the length of which the draft-pole is rigidly attached. This cross-bar B is perforated vertically at *a a a*, for a purpose hereinafter explained. C designates a beam, which is rigidly but removably secured to the draft-pole, and in line therewith. To the rear end of this beam C is secured a standard, which is inclined backward, and which carries on its lower end a shovel, *b*, of suitable shape, for stirring the earth and throwing it right and left, which shovel is designed to run between the rows of plants. D D represent two beams, which carry on their rear ends standards *d d'*, to which standards plowshares I I are applied, which turn the soil from the plants toward the center of the row. The front ends of the beams D D are pivoted to the cross-bar B by means of bolts *e e*, which pass through bracing-straps F F, applied on the top of said cross-bar B, through the holes *a a a*, and through the said beams.

The bolts *e e* are removable for the purpose of allowing the front ends of the beams D D to be adjusted at different distances from the center of cross-bar B, according to the width of the row, and the amount of land which it is desired to take.

The rear ends of these beams are provided with handles or stilts G G. They are also connected together by means of a cross-bar, H, which is pivoted to them by means of bolts *f f*. The bar H is provided with a number of holes to receive said bolts *f f*, and to allow the rear ends of the beams to be adjusted at different distances apart.

It will be seen, from the above description, that I am able to give a lateral motion to the rear plows, and thus accommodate them to the inequalities of the rows of plants; also, that I am able to adjust my plows to run at different angles; also, to adjust them for different widths of rows.

Furthermore, it will be seen that I can remove my front intermediate shovel-plow when I wish to convert the improvement into a double cultivator.

What I claim as new, and desire to secure by Letters Patent, is—

The central plow *b* of a gang of plows, rigidly but removably attached to a draft-pole, A, in combination with plows *g g*, of which the beams D D are pivoted to a transverse cross-bar, B, which is rigidly secured to the rear end of the draft-pole A, which beams D D are laterally adjustable for different widths of rows, and which are connected together at or near their rear ends, substantially as and for the purposes specified.

In testimony that I claim the above I have hereunto subscribed my name in the presence of two witnesses.

JASPER DAY LYNCH.

Witnesses:
J. G. WILSON,
C. T. HARRIS.